(12) United States Patent
Minobe et al.

(10) Patent No.: US 9,264,572 B2
(45) Date of Patent: Feb. 16, 2016

(54) IMAGE READING DEVICE

(71) Applicants: Tadashi Minobe, Chiyoda-ku (JP);
Takahito Nakanishi, Chiyoda-ku (JP);
Seiichi Matsumura, Chiyoda-ku (JP);
Tetsuo Funakura, Chiyoda-ku (JP);
Hiroyuki Kawano, Chiyoda-ku (JP);
Tatsuki Okamoto, Chiyoda-ku (JP);
Taku Matsuzawa, Chiyoda-ku (JP);
Yasunori Matsumoto, Chiyoda-ku (JP)

(72) Inventors: Tadashi Minobe, Chiyoda-ku (JP);
Takahito Nakanishi, Chiyoda-ku (JP);
Seiichi Matsumura, Chiyoda-ku (JP);
Tetsuo Funakura, Chiyoda-ku (JP);
Hiroyuki Kawano, Chiyoda-ku (JP);
Tatsuki Okamoto, Chiyoda-ku (JP);
Taku Matsuzawa, Chiyoda-ku (JP);
Yasunori Matsumoto, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 79 days.

(21) Appl. No.: 14/350,268

(22) PCT Filed: Oct. 24, 2012

(86) PCT No.: PCT/JP2012/077472
§ 371 (c)(1),
(2) Date: Apr. 7, 2014

(87) PCT Pub. No.: WO2013/062002
PCT Pub. Date: May 2, 2013

(65) Prior Publication Data
US 2014/0246570 A1  Sep. 4, 2014

(30) Foreign Application Priority Data
Oct. 25, 2011 (JP) .................. 2011-234078

(51) Int. Cl.
*H04N 1/193* (2006.01)
*H04N 1/19* (2006.01)
*H04N 1/03* (2006.01)

(52) U.S. Cl.
CPC .............. *H04N 1/19* (2013.01); *H04N 1/0303* (2013.01); *H04N 1/0305* (2013.01);

(Continued)

(58) Field of Classification Search
CPC .............. H04N 1/193; H04N 1/1932–1/1935; H04N 1/1937; H04N 2201/0091; H04N 2201/0093
USPC ................... 250/227.2, 227.26; 358/474, 475
See application file for complete search history.

(56) References Cited

U.S. PATENT DOCUMENTS

| 5,985,491 A | 11/1999 | Kim et al. |
| 7,884,976 B2 | 2/2011 | Minobe et al. |

(Continued)

FOREIGN PATENT DOCUMENTS

| CN | 101453541 A | 6/2009 |
| CN | 101981910 A | 2/2011 |

(Continued)

OTHER PUBLICATIONS

International Search Report Issued Nov. 27, 2012 in PCT/JP12/077472 Filed Oct. 24, 2012.

(Continued)

*Primary Examiner* — Renee D Chavez
(74) *Attorney, Agent, or Firm* — Oblon, McClelland, Maier & Neustadt, L.L.P.

(57) ABSTRACT

An image reading device including: concave first lens mirrors that are arranged in an array shape along a main scanning direction and that collimate scattered light reflected by an irradiated object and reflect the scattered light as a substantially parallel bundle of rays that are angled in a sub-scanning direction; planar mirrors that reflect light from the first lens mirrors; apertures that are arranged in an array shape and that allow light from the planar mirrors to pass through by way of openings that are arranged in an array shape and that are light-shielded therearound for selectively allowing light to pass through; concave second lens mirrors that are arranged in an array shape into which light from the apertures is incident and that reflect the light from the apertures as converged light; and light receivers that have light receiving areas on which light from the second lens mirrors is incident and that form images that correspond to light from the openings.

11 Claims, 14 Drawing Sheets

(52) U.S. Cl.
CPC ............. *H04N 2201/0081* (2013.01); *H04N 2201/0246* (2013.01); *H04N 2201/02456* (2013.01); *H04N 2201/02483* (2013.01); *H04N 2201/02485* (2013.01); *H04N 2201/02493* (2013.01)

(56) References Cited

U.S. PATENT DOCUMENTS

| | | | |
|---|---|---|---|
| 8,107,138 | B2 | 1/2012 | Minobe et al. |
| 8,228,566 | B2 | 7/2012 | Kawano et al. |
| 8,482,813 | B2 | 7/2013 | Kawano et al. |
| 2009/0147321 | A1 | 6/2009 | Minobe et al. |
| 2009/0237750 | A1 | 9/2009 | Tatsuno et al. |
| 2009/0316224 | A1 | 12/2009 | Kawamura et al. |

FOREIGN PATENT DOCUMENTS

| | | |
|---|---|---|
| EP | 2 068 548 A2 | 6/2009 |
| JP | 4 138766 | 5/1992 |
| JP | 5 014600 | 1/1993 |
| JP | 5 224005 | 9/1993 |
| JP | 6 022086 | 1/1994 |
| JP | 8 289166 | 11/1996 |
| JP | 9 127319 | 5/1997 |
| JP | 10 153751 | 6/1998 |
| JP | 11 008742 | 1/1999 |
| JP | 2002 049326 | 2/2002 |
| JP | 2006 259544 | 9/2006 |
| JP | 2009 177394 | 8/2009 |
| JP | 2009 218992 | 9/2009 |
| JP | 2009 244500 | 10/2009 |
| JP | 2010 004365 | 1/2010 |
| JP | 4453752 | 2/2010 |
| JP | 2010 093670 | 4/2010 |
| JP | 2010 175922 | 8/2010 |
| JP | 2010 212869 | 9/2010 |
| JP | 4594411 | 9/2010 |
| JP | 2010 226596 | 10/2010 |
| JP | 2011 193205 | 9/2011 |

OTHER PUBLICATIONS

Office Action issued on Dec. 9, 2014 in the corresponding Japanese Patent Application No. 2011-234078 (with English Translation).

Extended European Search Report issued Oct. 20, 2015 in Patent Application No. 12844002.1.

Office Action issued Sep. 8, 2015 in Chinese Patent Application No. 201280052581.2 (with English language translation).

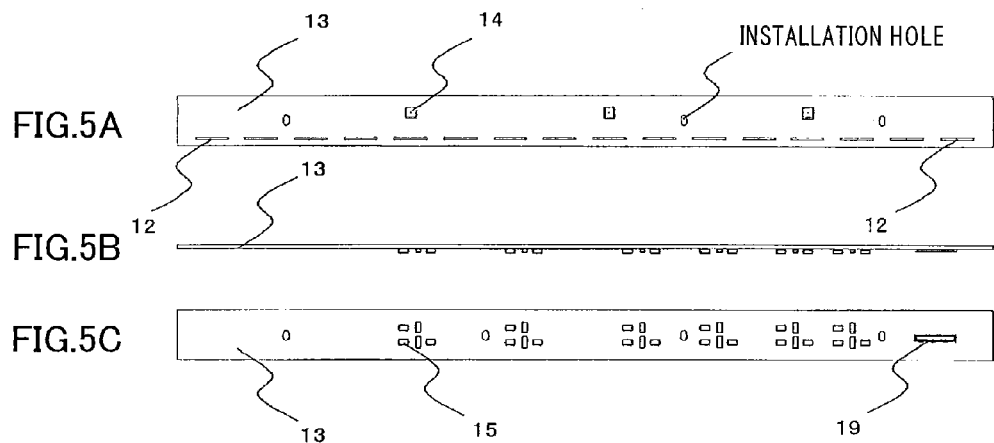
FIG.5A
FIG.5B
FIG.5C
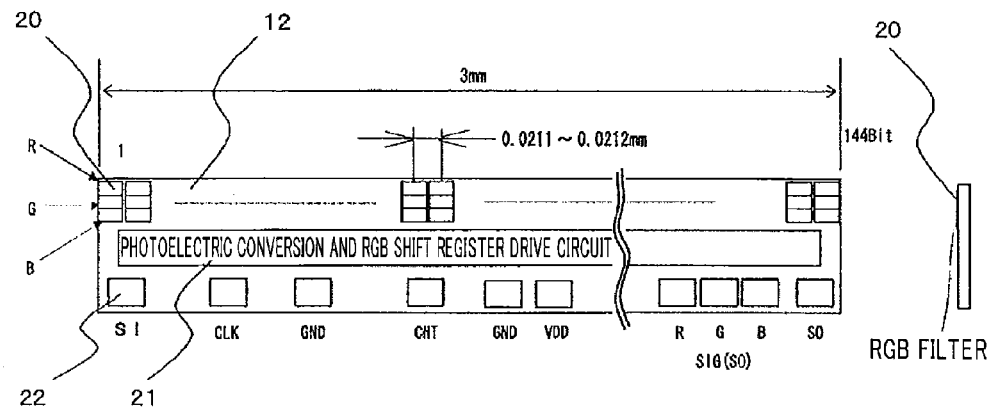
FIG.6A   FIG.6B

FIG.10A LC 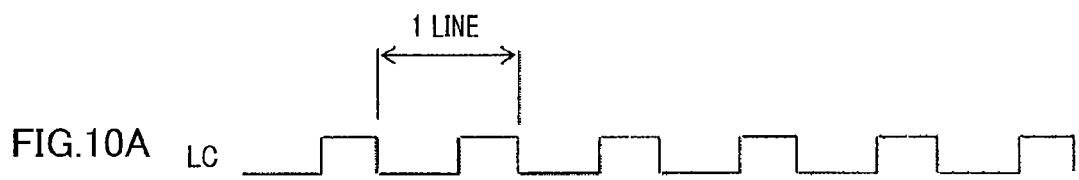
FIG.10B SI 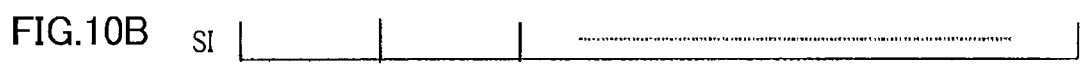
FIG.10C CLK 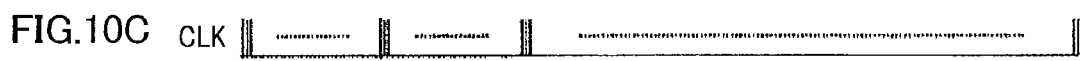
FIG.10D SO-R 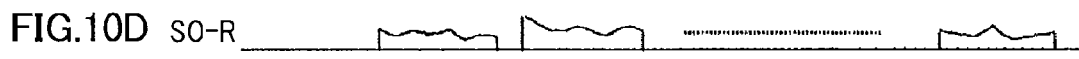
FIG.10E SO-G 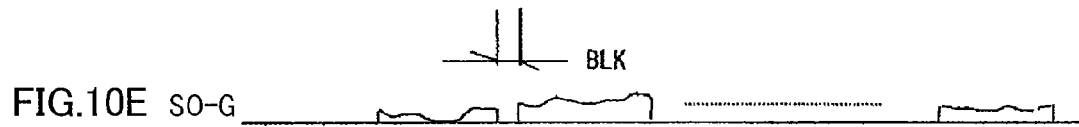
FIG.10F SO-B 
FIG.10G CNT 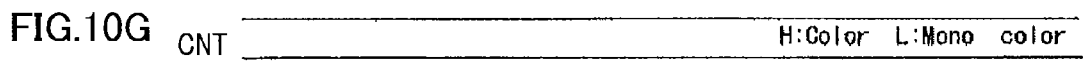

US 9,264,572 B2

IMAGE READING DEVICE

TECHNICAL FIELD

The present invention relates to an image reading device that is used by a copier or banking terminal device and the like for reading images or identifying images.

BACKGROUND ART

As image reading devices that read image information, there are, for example, reading devices such as disclosed in patent literature 1 and patent literature 2 that use a mirror array.

CITATION LIST

Patent Literature

Patent literature 1: Japanese Patent No. 4,453,752 (see FIG. 1)
Patent literature 2: Japanese Patent No. 4,594,411 (see FIG. 1)

SUMMARY OF THE INVENTION

Technical Problem

However, the image reading device that is disclosed in patent literature 1 is constructed such that paths of light rays that go from first mirrors 6 to second mirrors 11 by way of first lenses 7, aperture mirrors 8 and second lenses 9 are arranged in an array shape of plural parallel rows in a main scanning direction. Therefore, there is a problem in that separating light rays of adjacent paths is difficult.

In patent literature 2, an image reading device is disclosed having construction in which the direction of the first mirrors 6 is alternately changed for each adjacent path of light rays; and with this method it is definitely possible to separate adjacent light rays. However, the first mirrors 6 of adjacent light rays are close to each other, so that there is a problem in that a structure for supporting the first mirrors 6 becomes thin, and stably supporting the optical axes of the imaging optical system is difficult.

In order to solve the problems described above, the objective of this invention is to provide an image reading device that has stable optical axes, and that reduces degradation of image quality due to interference between light rays in adjacent light paths.

Solution to the Problem

In order to accomplish the objective above, the image reading device of the present invention is provided with: concave first lens mirrors that are arranged in an array shape along a main scanning direction and that collimate scattered light reflected by an irradiated object and reflect the scattered light as a substantially parallel bundle of rays that are angled in a sub-scanning direction; planar mirrors that reflect light from the first lens mirrors; apertures that are arranged in an array shape and that allow light from the planar mirrors to pass through by way of openings that are arranged in an array shape and that are light-shielded therearound for selectively allowing light to pass through; concave second lens mirrors that are arranged in an array shape into which light from the apertures is incident and that reflect the light from the apertures as converged light; and light receivers that have light receiving areas on which light from the second lens mirrors is incident and that form images that correspond to light from the openings.

Advantageous Effects of the Invention

With the image reading device of this invention, that adjacent light paths of an imaging optical system are arranged in an array shape so as not to come close to each other, so that it is possible to obtain an image reading device in which optical axes are stabilized by using solid construction and degradation of image quality due to interference of light rays is reduced.

BRIEF DESCRIPTION OF THE DRAWINGS

FIGS. 5A, 5B and 5C are plane drawings that illustrate as a reference each side of a sensor board of the image reading device of the first embodiment of the invention.

FIGS. 6A and 6B are plane drawings of a sensor IC of the image reading device of the first embodiment of the invention;

FIGS. 10A to 10G are timing charts for the image reading device of the first embodiment of the invention;

DESCRIPTION OF EMBODIMENTS

Embodiment 1

Figure 1:
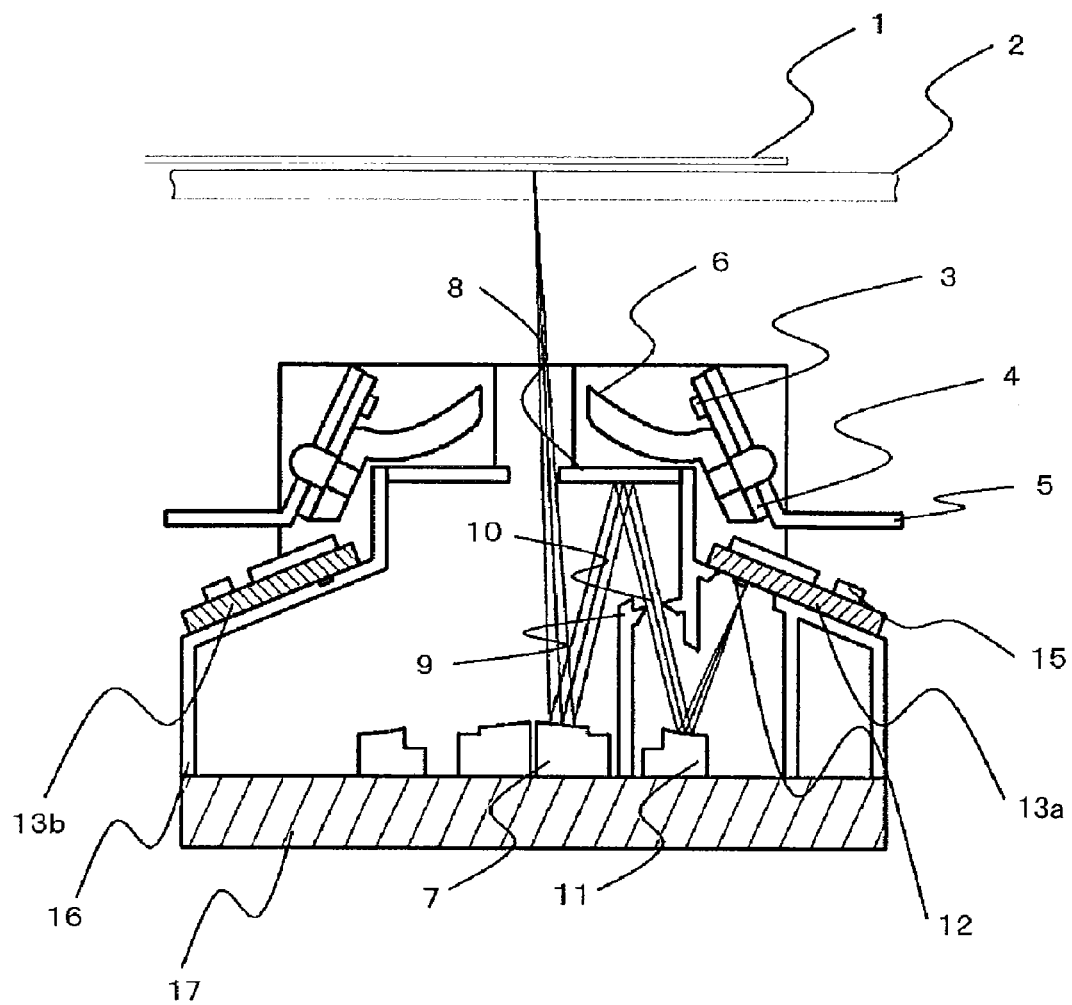
FIG. 1 is a cross-sectional drawing of an image reading device of a first embodiment of the invention.

In the following, an image reading device of a first embodiment of this invention will be explained using FIG. 1. FIG. 1 is a cross-sectional drawing of the image reading device of a first embodiment. In FIG. 1, the image reading device has irradiation sources (light sources) 3, printed circuit boards 4, radiation plates 5, concave mirrors 6, first lens mirrors 7, planar mirrors 8, apertures 9, openings 10, second lens mirrors 11, sensor ICs 12, sensor boards 13, electronic parts 15, a frame 16 and a bottom plate 17.

An irradiated object 1 is an irradiated object (also called a document) such as a document, printed media or the like. The top plate 2 is a transparent top plate that supports the irradiated object 1. The irradiation sources (light sources) 3 are irradiation sources such as light-emitting diodes (also called LEDs) or the like that irradiate light. The printed circuit boards (also called LED boards) 4 are boards for securing the irradiation sources 3 and supplying electric current. The radiation plates 5 receive heat that is generated by the irradiation sources 3 by way of the printed circuit boards 4, and radiate that heat into the air. The concave mirrors 6 reflect light that is emitted from the irradiation sources 3 in the direction of the document 1, and make that light substantially parallel light. The first lens mirrors (also called the first lenses) 7 receive scattered light from the document 1. The planar mirrors 8 receive the substantially parallel light from the first lenses 7, and reflect that parallel light. The apertures 9 receive the parallel light from the planar mirrors 8. The openings 10 are provided on or near the surface of the apertures 9, and by having light-shielded surroundings, restrict the light that passes through the apertures 9. The second lens mirrors (also called the second lenses) 11 receive and concentrate the light that passes from the apertures 9.

The sensor ICs 12 receive light that passes through the openings 10 and reflected from the second lenses 11, and are MOS semiconductor sensor ICs (also called light receivers) that comprise a photoelectric conversion circuit that performs photoelectric conversion and a driver that drives the photoelectric conversion circuit. The sensor boards 13 are sensor boards on which the sensor ICs 12 are mounted, and comprise a first sensor board 13a and a second sensor board 13b. The electronic parts 15 are electronic parts such as capacitors, resistors or the like that are mounted on the sensor boards 13. The frame 16 secures the imaging optical system that forms images and that comprises the sensor ICs and mirrors. The bottom plate 17 secures the lenses and frame 16. Moreover, as will be described later and as illustrated in FIG. 5, signal processing ICs (ASIC) 14, which process signals that have undergone photoelectric conversion by the sensor ICs 12, and an internal connector 19, which electrically connects a signal processing board on which the ASIC 14 and the like are mounted and a sensor board 13, are mounted on the sensor board 13.

The portion that comprises the irradiation source 3, LED board 4 and concave mirror 6 is called the lighting optical system, and the frame portion, except for the lighting optical system, in which the reflected light (scattered light) from the irradiated object 1 propagates, and that houses the imaging optical system that comprises lenses and mirrors is called the imaging unit (imaging optical system unit). In the figures, reference numbers that are the same indicate identical parts or corresponding parts.

Figure 2:
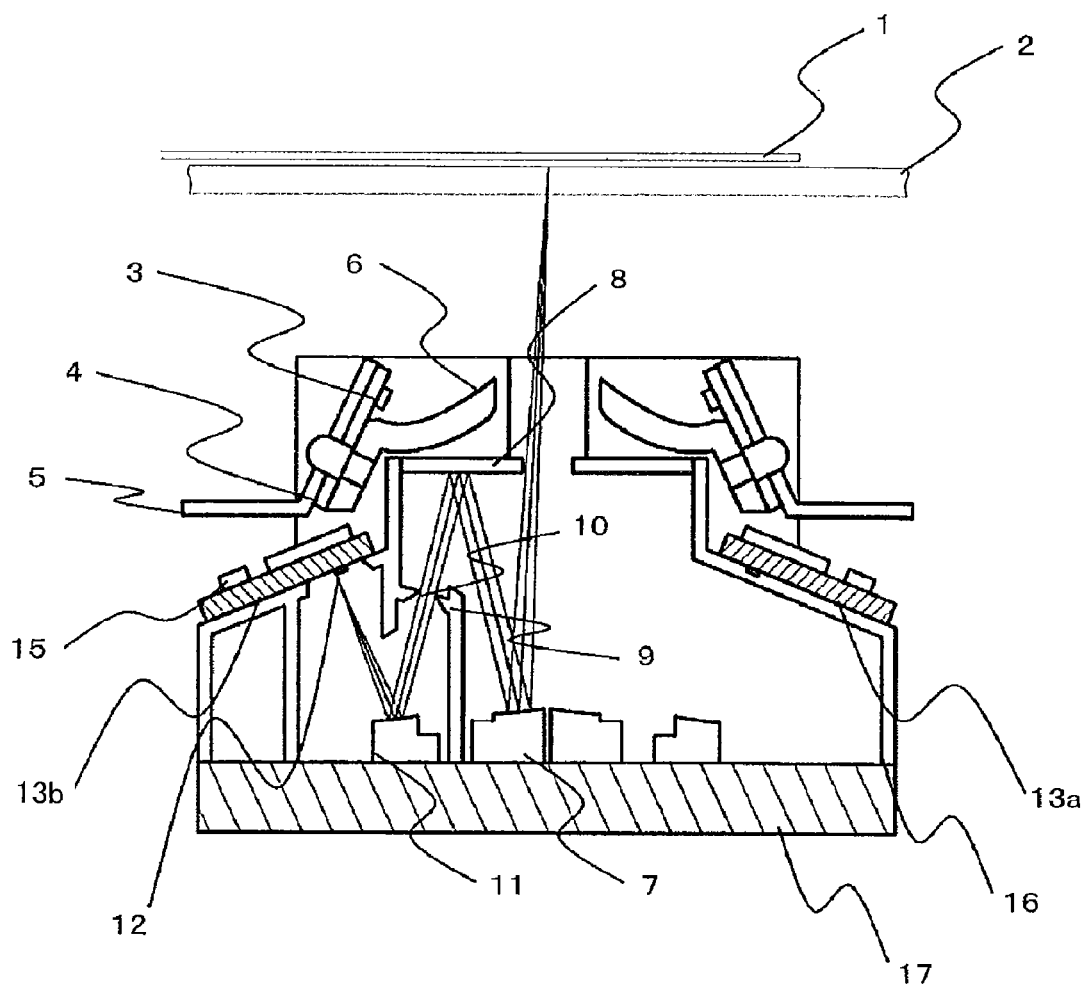
FIG. 2 is a cross-sectional drawing as seen from a different position in a main scanning direction of the image reading device of the first embodiment of the invention.

FIG. 2 is a cross-sectional drawing at a different position in the main scanning direction of the cross-sectional drawing illustrated in FIG. 1. The portion of the imaging optical system that forms the light propagation path has symmetrical structure with respect to the reading position as that illustrated in FIG. 1. In the figure, the reference numbers that are the same as those in FIG. 1 represent identical or corresponding parts.

Figure 3A:
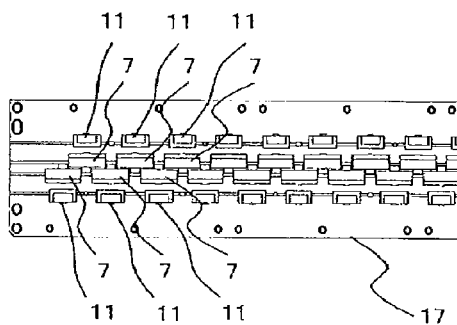
FIG. 3A and FIG. 3B are schematic plane drawings of arrangement of imaging optical systems of the image reading device of the first embodiment of the invention.
Figure 3:
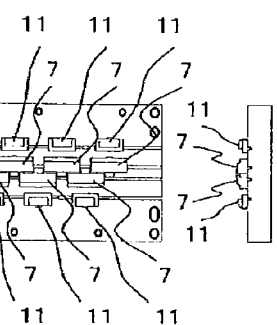

FIG. 3A and FIG. 3B are schematic plane drawings for explaining the arrangement of the imaging optical system that is mounted in the image reading device of this first embodiment of the invention, and that is placed in an array shape at a pitch of 10 mm.

With the read line that extends in the main scanning direction (width direction of the document 1 being read) at the center, the light receiving lines are formed on one side (one side in the sub-scanning direction), with adjacent light receiving lines being provided in an array shape having an alternating symmetrical shape. The first lenses 7 and second lenses 11 are arranged on the bottom plate 17 in a staggered shape in this way so that lenses that are placed on one side in the sub-scanning direction and lenses that are placed on the other side in sub-scanning direction are alternately adjacent. In the figures, reference numbers that are the same as in FIG. 1 indicate identical or corresponding parts.

Figure 4A:
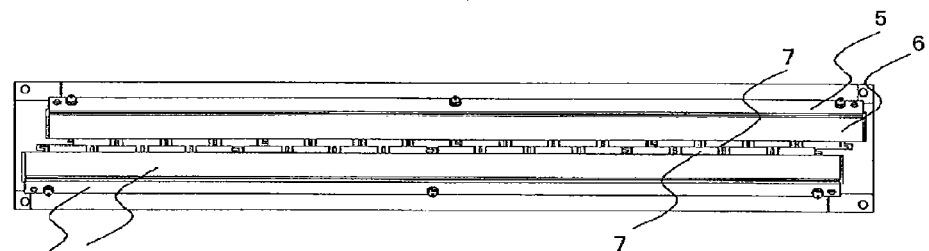
FIGS. 4A, 4B and 4C are plane drawings that include side views illustrating the overall construction of the image reading device of the first embodiment of the invention, and are drawings that illustrate as a reference each side.
Figures 4B, 4C:
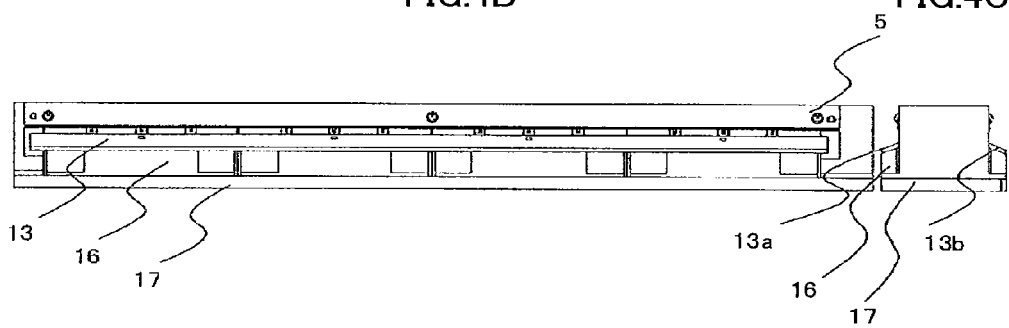

FIG. 4A, FIG. 4B and FIG. 4C are drawings of the overall construction of the image reading device of this first embodiment of the invention, and are plane drawings that illustrate each of the side surfaces. In the figures, reference numbers that are the same as in FIG. 1 indicate identical or corresponding parts.

FIG. 5A, FIG. 5B and FIG. 5C are plane drawings of a first sensor board 13a and a second sensor board 13b. Sensor ICs 12 that are linearly arranged on the first sensor board 13a, and the sensor ICs 12 that are linearly arranged on the second sensor board 13b are arranged parallel to each other, and together, these sensor ICs 12 complementarily read the image information that is reflected from the irradiated part of the irradiated object 1. Therefore, it is okay for there to be a gap between adjacent sensor ICs 12 that are linearly arranged in one line, and the arrangement of the linearly arranged sensor ICs 12 can be staggered with each other in two parallel lines.

FIG. 6A and FIG. 6B are plane drawings of a sensor IC 12. A sensor IC 12 has photoelectric converters 20, a photoelectric conversion and RGB shift register drive circuit 21 and wire bonding pads 22. A photoelectric converter (also called a pixel) 20 is such that an RGB filter, which is made of a gelatin material or the like having a red color (R), green color (G) and blue color (B) per pixel (bit), is placed on the light-receiving surface thereof. The photoelectric conversion and RGF filter drive circuit 21 performs photoelectric conversion of light that is incident on the pixel 20 for each RGB color, then holds the output and drives the photoelectric converter. The wire bonding pads 22 are for input and output of signals and electric power to the sensor IC 12.

Figure 7A:
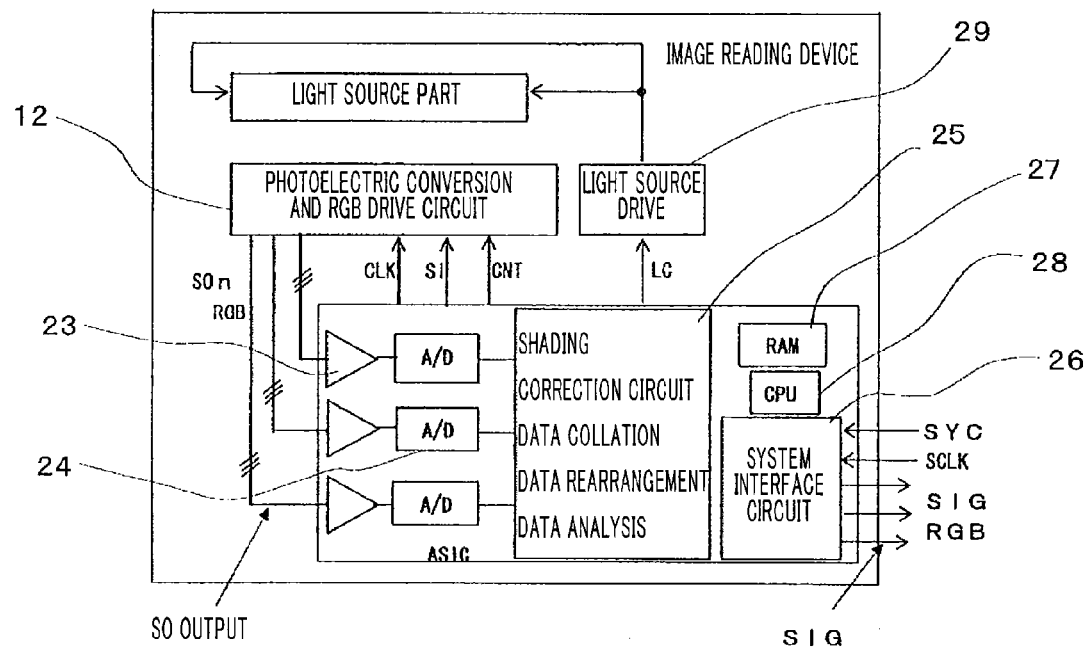
FIG. 7A is a block diagram of the construction of the image reading device of the first embodiment of the invention.

FIG. 7A is a block diagram of the configuration of the image reading device of this first embodiment. The image reading device comprises amplifiers 23, analog-to-digital converters (A/D converters) 24, a signal processor 25, a system interface circuit 26, a RAM 27, a CPU 28 and a light-source drive circuit 29. The amplifiers 23 amplify signals that have undergone photoelectric conversion by the sensor IC 12. The analog-to-digital converters 24 perform analog-to-digital conversion of the amplified photoelectric conversion output. The signal processor 25 performs signal processing of the digital output for each RGB color. The system interface circuit 26 exchanges signals between the image reading device and the main system side. The RAM 27 stores image information for each color. The CPU 28 controls the operation of each part of the image reading device. The light-source drive circuit 29 drives the light sources 3 and causes light to be irradiated onto the irradiated object 1.

The operation of the optical system of the image reading device of this first embodiment of the invention will be explained. Light from light sources 3 that are arranged in an array shape along the main scanning direction of the irradiated object 1 is reflected by concave mirrors 6 that are arranged so as to extend in the main scanning direction of the irradiated object 1, and irradiated on an irradiated part of the irradiated object 1 as parallel light. The scattered light that is reflected by the irradiated object 1 is angled toward one side (the right direction in FIG. 1) in the sub-scanning direction by the concave first lenses 7 and reflected as collimated light. The light from the first lenses 7 is then angled and reflected to the one side in the sub-scanning direction by the planar mirrors 8. The light from the planar mirrors 8 is irradiated to the windows (openings 10) of apertures 9 as a substantially parallel bundle of rays. Furthermore, the light that is radiated from the windows 10 is angled and reflected to the one side in the sub-scanning direction by the second lenses 11, and enters into the sensor ICs 12 for each light beam, so that the image information is formed into inverted images on the light-receiving surfaces of the sensor ICs 12.

FIG. 2 illustrates a light path in which scattered light that is reflected by the irradiated object 1 is angled to the other side in the sub-scanning direction (the left direction in FIG. 2), and is symmetric to the operation in FIG. 1 about a plane that is orthogonal to the sub-scanning direction. Some of the light that is reflected by the irradiated object 1 travels along a light path that is angled and reflected by the first lenses 7 to one side in the sub-scanning direction from the vertical direction as illustrated in FIG. 1, and some of the light travels along a light path that is angled and reflected by the first lenses 7 to the other side in the sub-scanning direction as illustrated in FIG. 2. The first lenses 7 that are arranged in a staggered shape on the bottom plate 17 are such that first lenses 7 that angle and reflect the reflected light from the irradiated object 1 in opposite directions from each other are alternately adjacent. In other words, in FIG. 1 and FIG. 2, the light paths that enter into the sensor IC 12 that are mounted on the first sensor board 13a and light paths that enter into the sensor IC 12 that are mounted on the second sensor board 13b do not cross, so that there is an effect in that there is no interference of light rays of the light paths.

Figure 8:
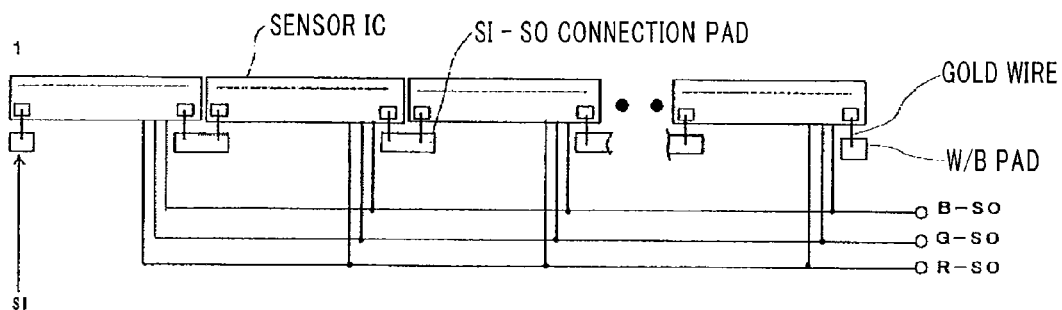
FIG. 8 is a connection diagram of the connection of sensor ICs of the image reading device of the first embodiment of the invention.
Figure 9:
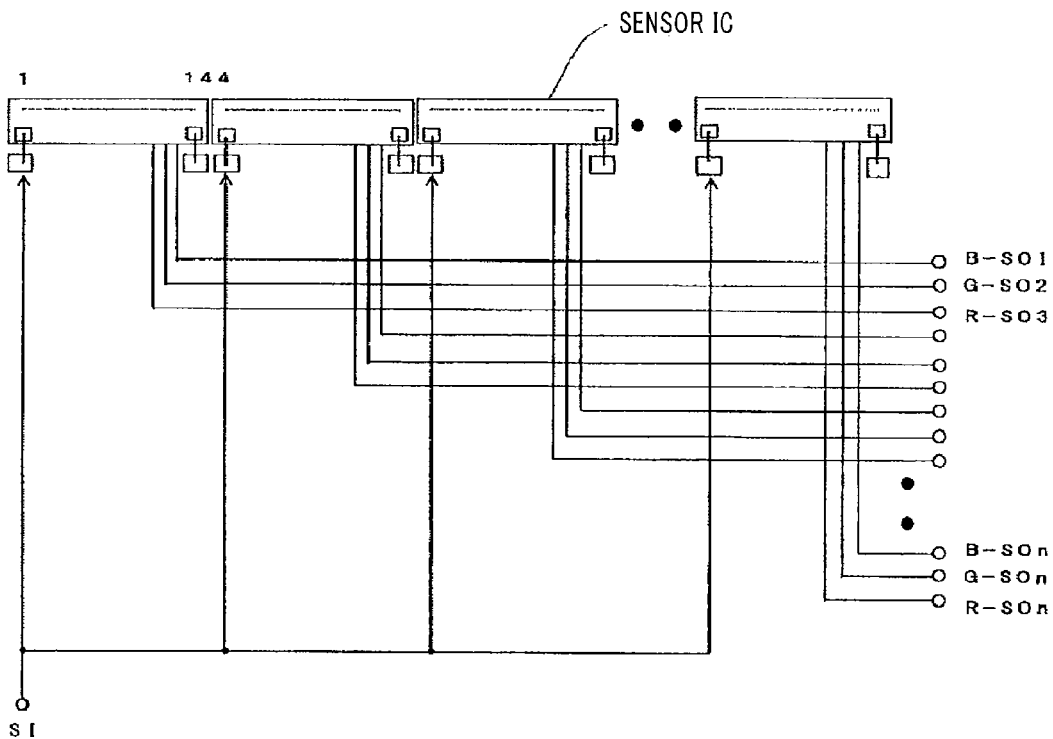
FIG. 9 is a connection diagram of another example of the connection of sensor ICs of the image reading device of the first embodiment of the invention.

Next, the operation of the image reading device of this first embodiment of the invention will be explained. In FIG. 7A, based on a system control signal (SYC) and system clock signal (SCLK) from the main system, a clock signal (CLK) for the signal processing IC (ASIC) 14 and a start signal (SI) that is synchronized with the clock signal are outputted to sensor ICs 12 by way of a system interface circuit 26. Then, according to that timing, consecutive analog signals for each of the pixels (n) are outputted for each read line from the sensor ICs 12. In the example illustrated in FIG. 8, analog signals are sequentially outputted for 7200 pixels, and in the example of divided output illustrated in FIG. 9, the analog signals are outputted with 144 pixels as one unit.

An analog signal that is amplified by an amplifier 23 undergoes A/D conversion by an A/D converter 24 and is converted to a digital signal, then after A/D conversion, the signal output for each pixel (bit) is processed by a correction circuit that performs shading correction and correction of all bits. This correction is performed by reading correction data from RAM 27 in which data that is read in advance from a reference test chart such as a white document or the like is stored as uniformly processed correction data, and computing a digital signal that corresponds to the A/D converted image information. This series of operations is performed under the control of the CPU 28. This correction data is used for correcting variation in sensitivity among each of the pixels of the sensor ICs 12 and unevenness of the light sources.

Figure 7B:
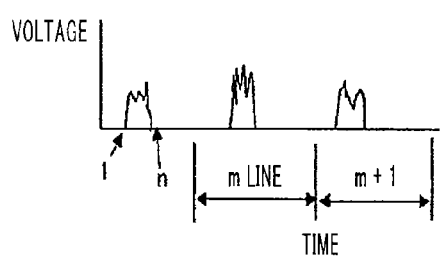
FIG. 7B is a drawing illustrating the change over time of the voltage in each line segment.
Figure 7C:
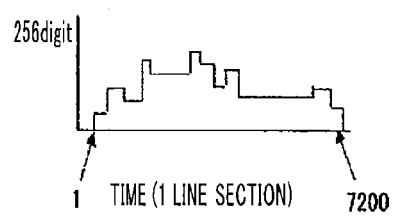
FIG. 7C is a drawing illustrating output values for each pixel in one line segment.

Next, the timing for driving the image reading device of this first embodiment of the invention will be explained using FIG. 7B, FIG. 7C and FIG. 10A to FIG. 10G. In FIG. 7B, FIG. 7C and FIG. 10A, the ASIC 14 that is connected to the CPU 28 turns ON the light-ON signal (LC) for the light sources, and the light-source drive circuit 29 emits white light by supplying electric power for a specified time to an LED 3. IN FIG. 10B to FIG. 10F, a start signal (SI) that is synchronized with a continuously driving CLK signal sequentially turns ON the output of the shift register of each element (pixel) that forms the RGB drive circuit of sensor IC 12, and by the corresponding switch group sequentially opening or closing the SIG (SO) line, RGB image information (image output) that is synchronized with the CLK is obtained. This image output is output of each image that is read and stored for the previous line. CNT illustrated in FIG. 10G is a color/monochrome switching signal, and normally is high level in the color mode. A BLK (blanking) time is set for each color read section for each color of one line, and setting of the exposure time is varied. Therefore, during the BLK time, all SIG (SO) are open.

Figure 11:
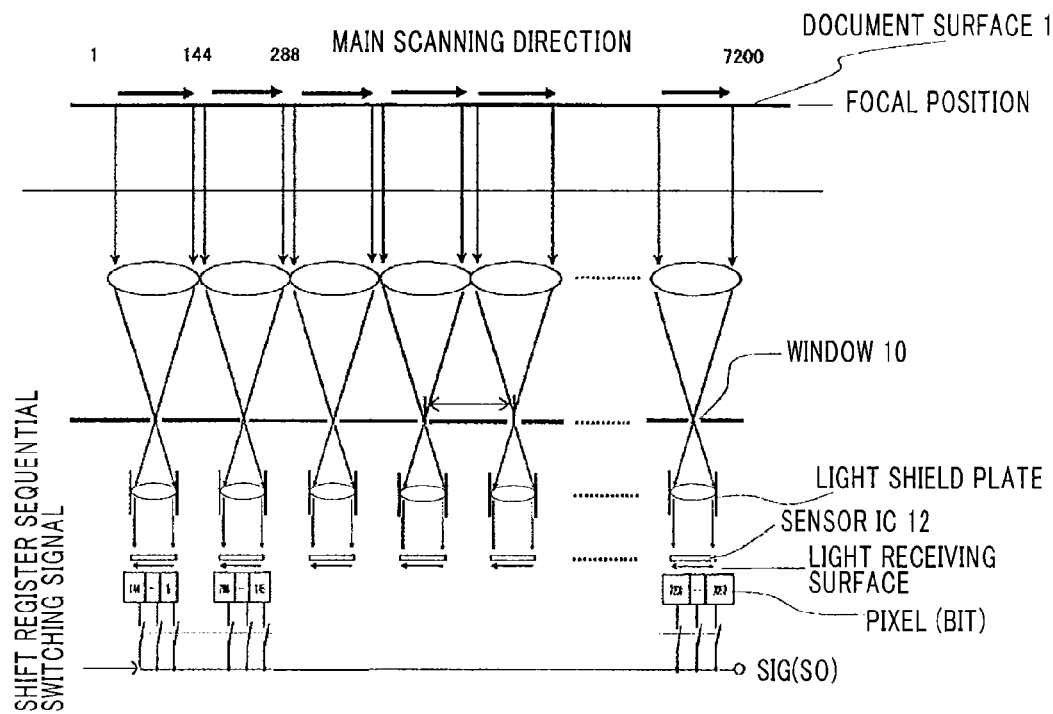
FIG. 11 is a principle drawing for explaining light paths in the image reading device of the first embodiment of the invention.

Next, the image signals SIG (SO) that are sequentially outputted will be explained using FIG. 11. FIG. 11 is a principle drawing for explaining the light paths in the main scanning direction. The scattered light that is the image information from the irradiated object 1 enters first lenses 7 that collimate and reflect the light so that the light becomes a substantially parallel bundle of rays when it is presumed that the light is emitted from a point light source on the surface of the irradiated object (document) 1. The light from each lens that is arranged in an array is reflected by the planar mirrors 8 and irradiated as a substantially parallel bundle of rays into the windows (openings 10) of apertures 9 that are arranged so as to be separated at a pitch of 10 mm. Furthermore, the light that is radiated from the windows 10 passes through second lenses 11 and enters sensor ICs 12 for each beam, so that the image information is formed as inverted images upside down on the light receiving surfaces of the sensor ICs 12. Therefore, the image information that is formed in the light receiving part of each sensor IC 12 is a reverse image with respect to the irradiated object 1 such as a document or the like. The SIG (SO) signals are simultaneously outputted by shift register sequential switching signals that are provided to the drive circuits of the sensor ICs 12 as a series of three analog signals for each of the RGB colors.

Figure 12:
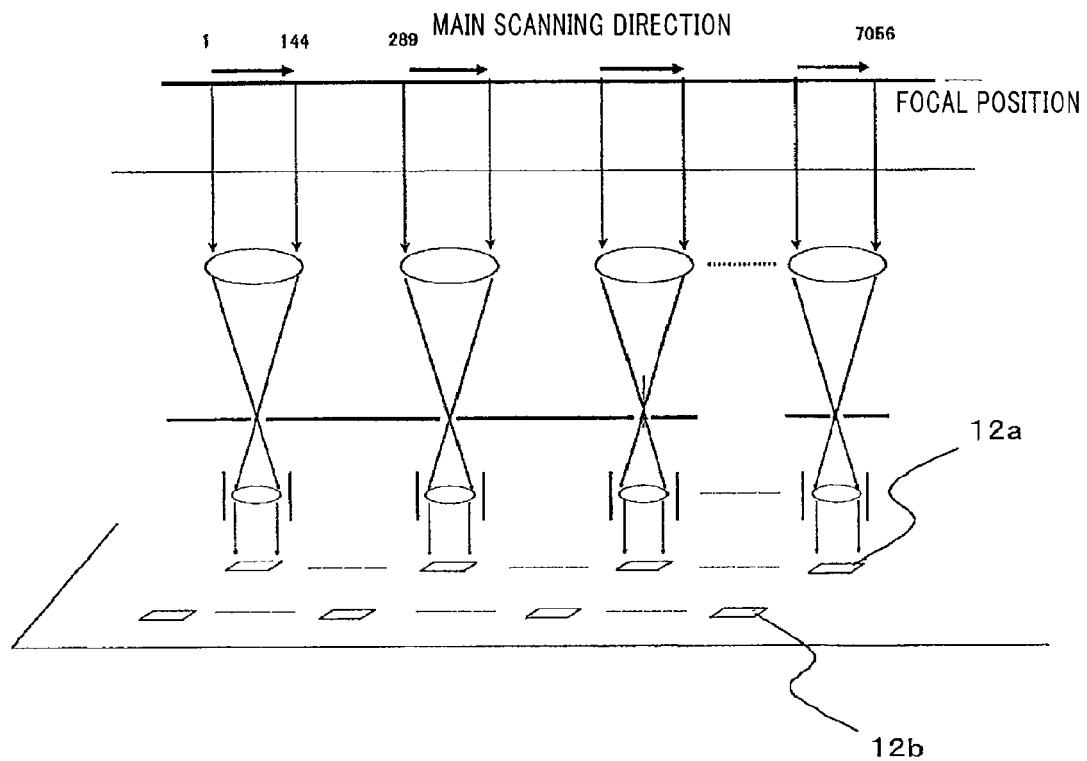
FIG. 12 is a principle drawing for explaining light paths in the image reading device of the first embodiment of the invention.

FIG. 12 is a principle drawing for explaining light paths arranged in an array shape in the main scanning direction that radiate light in an array in the same sub-scanning direction of an optical system. It is shown that the light that is effectively incident on sensor ICs 12 (12a, 12b) that are linked in two parallel rows differs for each adjacent array.

Figure 13:
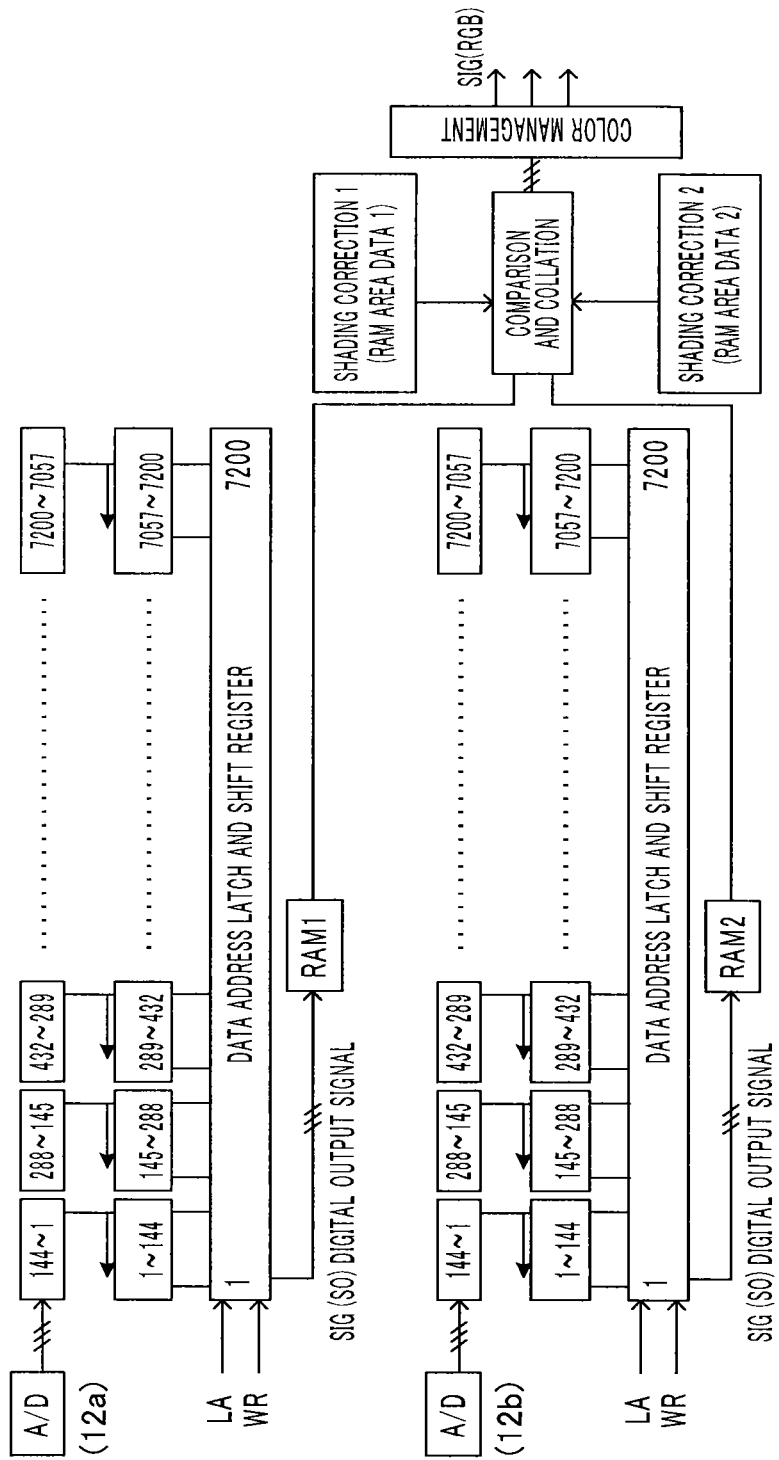
FIG. 13 is a drawing for explaining rearrangement of reverse image data and signal processing of the image reading device of the first embodiment of the invention.

FIG. 13 is a drawing for explaining the rearrangement of inverted data of A/D converted RGB signals and the signal processing performed, and illustrates the case in which data for each 144 bits is rearranged and signal processing is performed after that. In FIG. 13, each RGB (SO) signal is shifted to the left by a shift register circuit, and the shifted data is stored in a cell that is made up of a shift register circuit, and latched (LA). After that, at a write signal (WR), data that is rearranged from the first cell of the sensor IC 12 as SIG (SO) is stored in sequence in the RAM 27, and correction processing is performed. In this first embodiment, signal processing is performed on signals from two rows of sensor ICs 12a, 12b, so that processing will further be performed by the comparison, collation, thinning and restoration circuits in the next stage.

Figure 14:
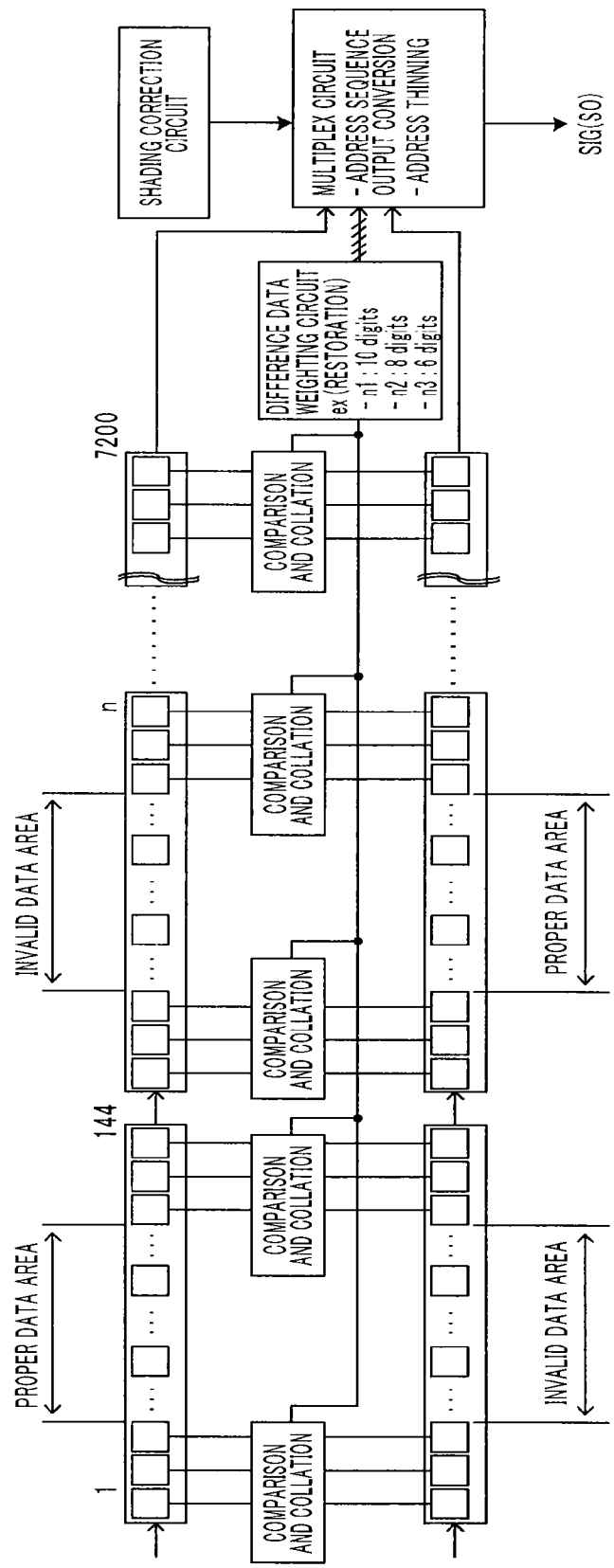
FIG. 14 is a block diagram for explaining comparison, collation, thinning and restoration circuits of the image reading device of the first embodiment of the invention.

FIG. 14 is a block diagram for explaining comparison, collation, thinning and restoration circuits. After rearranging inverted data, data stored in areas RAM 1 and RAM 2 of the RAM 27 is inputted to a shift register as sequential output, and the RAM 27 (RAM 1, RAM 2) data of each array border area is compared and collated. Light paths of adjacent arrays in the sub-scanning direction are inverted, so that comparison and collation are performed in order to improve ghosts in the main scanning direction due to reflection or the like of some unnecessary light caused by space between arrays on the same side and arrays on the opposite side, and after information of pixels in relevant positions of the shift register is compared, the difference is taken, and image data output is weighted. Weighting of data becomes greater the further the pixels are to the outside, and becomes less the further the pixels are to the inside. Moreover, in the area of internal pixels, properly reflected light areas are taken to be proper data, and light areas of light that are not properly reflected are taken to be invalid data. The addresses of these data are converted by a multiplexer circuit and then outputted. Data areas to be interpolated are set along the overlapping staggered positions of proper data and invalid data.

Image data that has undergone this correction processing is outputted by way of a system interface circuit 26 as SIG (RGB) color data by a color conversion, color management engine and the like of a color management system that includes data analysis, data recovery and the like as shown in FIG. 1 in Unexamined Japanese Patent Application Kokai Publication No. 8-289166.

Figure 15:
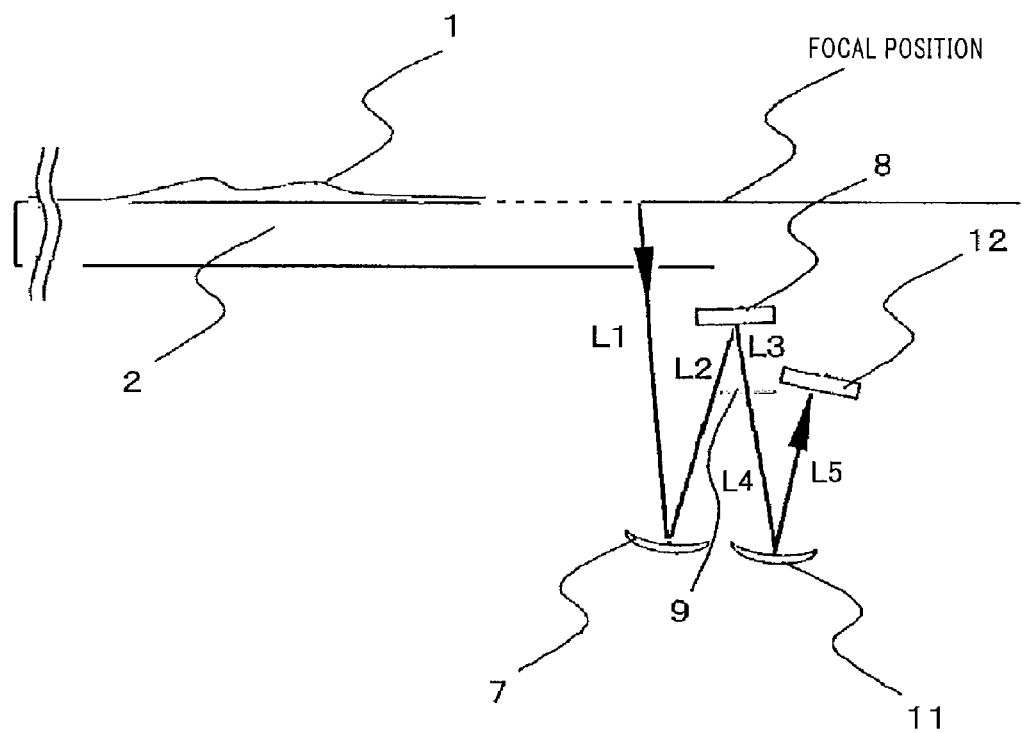
FIG. 15 is a drawing for explaining a light path in a sub-scanning direction of the image reading device of the first embodiment of the invention.
Figure 16:
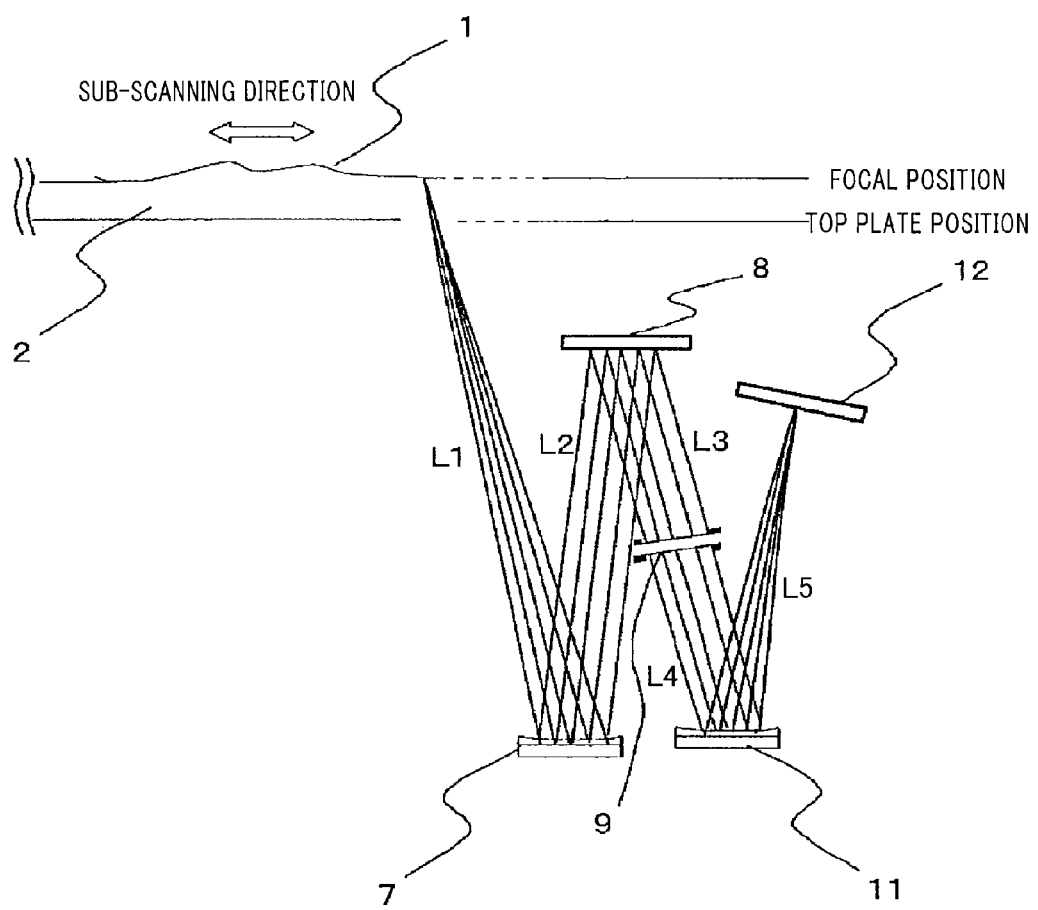
FIG. 16 is a drawing for explaining embodied light paths in the sub-scanning direction of the image reading device of the first embodiment of the invention.

FIG. 15 is a drawing for explaining optical distances. One focal position of the first lens 7 coincides with the irradiated object 1, and other focal position coincides with the aperture 9. Moreover, one focal position of the second lens 11 coincides with the aperture 9 and the other focal position coincides with the sensor IC 12. In other words, when expressing the distance from the irradiated object 1 to the first lens 7 as L1, the distance from the first lens 7 to the planar mirror 8 as L2, the distance from the planar mirror 8 to the aperture 9 as L3, the distance from the aperture 9 to the second lens 11 as L4 and the distance from the second lens 11 to the sensor IC 12 as L5, there exists the relationships L2+L3=L1 and L4=L5. FIG. 16 is a schematic drawing illustrating light beams in addition to the light paths, and illustrates parallel light that passes through the aperture 9.

Figure 17:
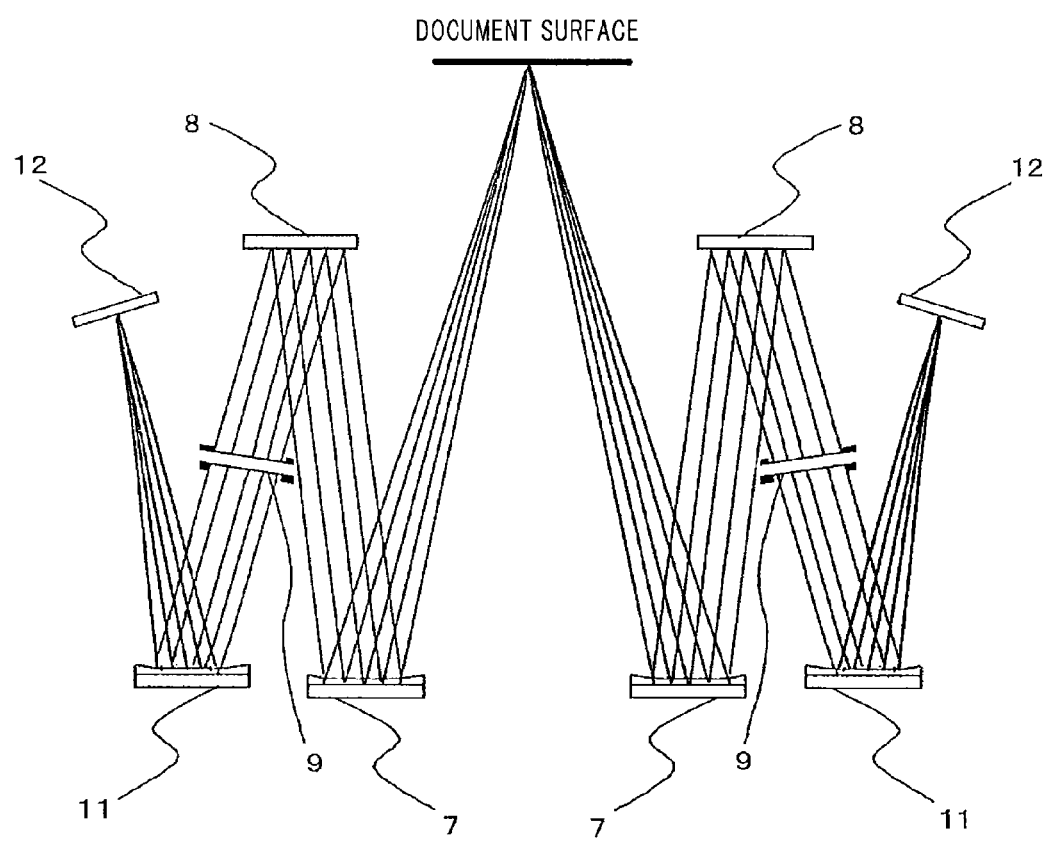
FIG. 17 is a drawing for explaining embodied light paths in the sub-scanning direction of the image reading device of the first embodiment of the invention.

FIG. 17 illustrates the light paths in the sub-scanning direction of combined adjacent optical systems in the first embodiment of the invention, and illustrates substantially parallel light rays that travel over the paths of optical distances L2, L3 and L4 from the first lenses 7 to the second lenses 11.

In FIG. 1 and FIG. 2, the optical axes of reflected light from the irradiated object 1 are angled a little from the vertical direction; however, this is done in order to perform signal processing of border areas of an imaging optical system such as first lenses 7 and the like that are staggered in an array shape. Therefore, in an image reading device that does not have staggered construction, or in an image reading device having low resolution or low reading speed, the optical axes can be vertical to the conveyance direction.

In the image reading device of this first embodiment of the invention, in order that adjacent light paths of imaging optical systems that are arranged in an array shape do not come close to each other, the light paths are alternately arranged symmetrically about the reading line as the center. Therefore, it is possible to obtain an image reading device in which optical axes are stabilized by using simple and solid construction and degradation of image quality due to interference of light rays is reduced.

Embodiment 2

Figure 18:
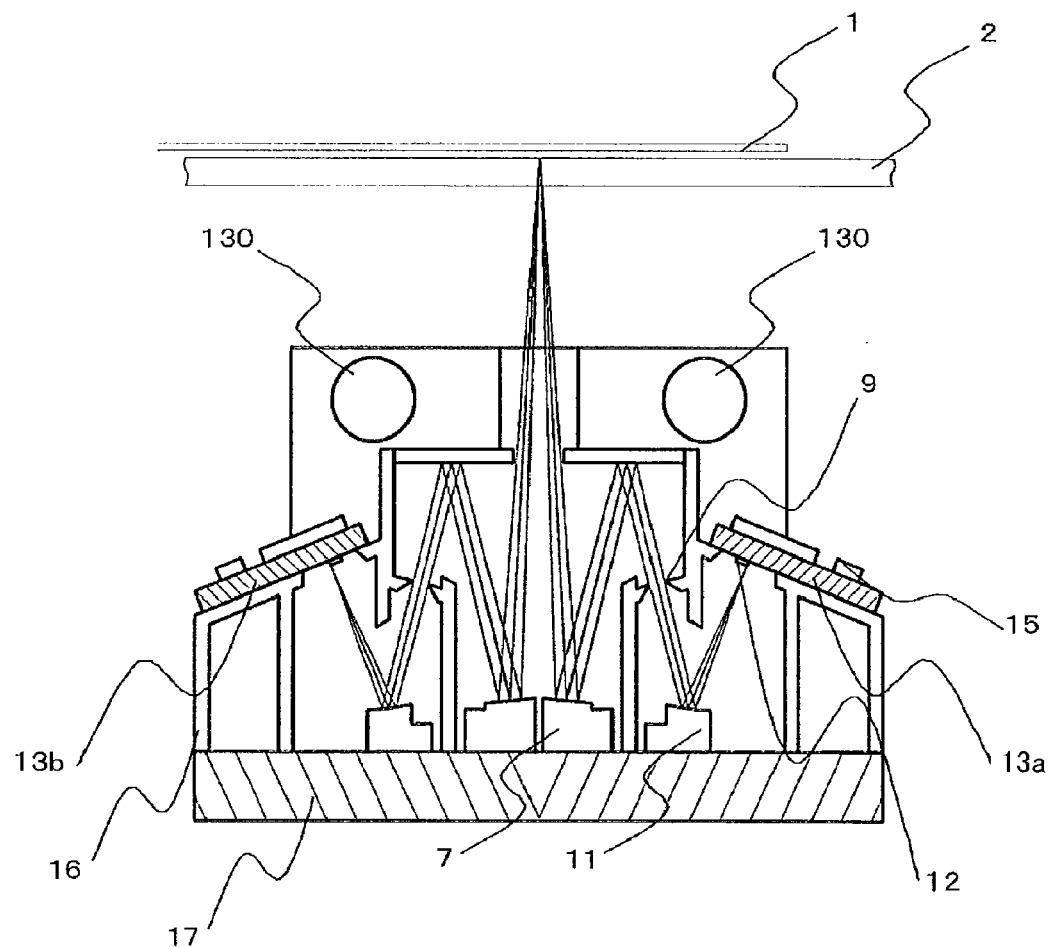
FIG. 18 is cross-sectional drawing of an image reading device of a second embodiment of the invention.

In the first embodiment of the invention, the case was described in which light sources were irradiated on an irradiated object 1 from both sides using array type light sources; however, in this second embodiment, the case is explained in which a rod shaped light-guiding member 130 is used. FIG. 18 is a cross-sectional drawing of the configuration of an image reading device of this second embodiment of the invention. In FIG. 18, the light-guiding member 130 is a rod shaped light-guiding member that allows light to propagate, and two light-guiding members are arranged extending in the main scanning direction of the irradiated object 1. In the figure, reference numbers that are the same as in FIG. 1 indicate identical or corresponding parts.

Figure 19:
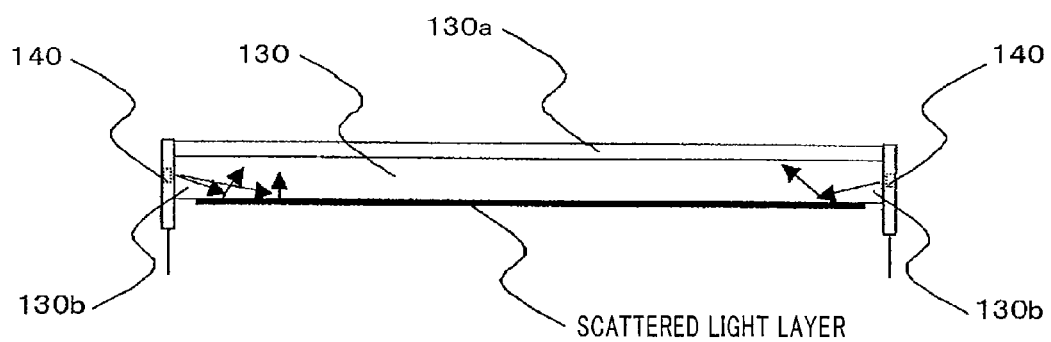
FIG. 19 is a drawing for explaining a light-source portion that includes a light-guiding member of the image reading device of the second embodiment of the invention.

FIG. 19 is a plane drawing for explaining a light source portion that includes the light-guiding member of this second embodiment of the invention. The irradiation source (light source) 140 is an irradiation source such as a light-emitting diode (called an LED) or the like that irradiates light. A light outputter 130a is a light output part of the light-guiding member 130. A light inputter 130b is a light input part for lighting the light-guiding member 130. In the figure, reference numbers that are the same as in FIG. 1 indicate identical or corresponding parts.

In FIG. 19, the lighting that is irradiated from the LED 140 is irradiated into the light-guiding member from the light inputter 130b of the light-guiding member 130, propagates inside the light-guiding member 130, is radiated to the outside of the light-guiding member from the light outputter 130a, and is irradiated to the irradiated part of a document 1 along the main scanning direction of the document 1.

With the image reading device of this second embodiment of the invention, the irradiated light from the LED 140 located on the end of the rod shaped light-guiding member 130 irradiates the document 1 from the light outputter 130a. As a result, when compared with the first embodiment, this embodiment is advantageous in that the image reading device can be constructed with fewer LEDs than in the first embodiment, and can be more compact.

In this second embodiment of the present invention, there are two light-guiding members 130 for irradiated object 1; however, it is also possible to irradiate light from only one.

The embodiments described above can undergo various modifications within the range and scope of the present invention. The embodiments above and for explaining the invention and do not limit the range of the invention. The range of the present invention is indicated in the accompanying claims more than in the embodiments. Various modifications that are within the range of the claims or are within a range that is equivalent to the claims of the invention are considered to be within the claims of the invention.

This application claims priority based on the description, scope of claims, drawings and abstract of Japanese Patent Application No. 2011-234078 filed on Oct. 25, 2011. The entire disclosure of the aforesaid application is incorporated herein by reference.

REFERENCE SIGNS LIST

1 Irradiated object (document), 2 Top plate, 3 Irradiation source (light source, LED), 4 Printed circuit board (LED board), 5 Radiation plate, 6 Concave mirror, 7 First lens mirror (first lens), 8 Planar mirror, 9 Aperture, 10 Opening, 11 Second lens mirror (second lens), 12, 12a, 12b Sensor IC, 13 Sensor board, 13a First sensor board, 13b Second sensor board, 14 Signal processing IC (ASIC), 15 Electronic part, 16 Frame, 17 Bottom plate, 19 Internal connector, 20 Photoelectric converter (pixel, bit), 21 Photoelectric conversion and RGB shift register drive circuit, 22 Wire bonding pad, 23 Amplifier, 24 Analog-to-digital converter (A/D converter), 25 Signal processor, 26 System interface circuit, 27 RAM (Random Access Memory), 28 CPU, 29 Light-source drive circuit, 130 Light-guiding member, 130a Light outputter, 130b Light inputter, 140 Irradiation source (light source, LED)

The invention claimed is:

1. An image reading device, comprising:
concave first lens mirrors that are arranged opposite to an irradiated object in an array shape along a main scanning direction and that collimate scattered light reflected by the irradiated object and reflect the scattered light toward a side of the irradiated object as a substantially parallel bundle of rays that are angled in a sub-scanning direction;
planar mirrors that reflect light from the first lens mirrors in a direction opposite to the irradiated object;
apertures that are arranged in an array shape and that allow light from the planar mirrors to pass through by way of openings that are arranged in an array shape and that are light-shielded therearound for selectively allowing light to pass through;
concave second lens mirrors that are arranged in an array shape into which light from the apertures is incident and that reflect the light from the apertures as converged light; and
light receivers that have light receiving areas on which light from the second lens mirrors is incident and that form images that correspond to light from the openings.

2. The image reading device according to claim 1, further comprising:
light sources that irradiate light along the main scanning direction; and
concave mirrors that reflect the light from the light sources in a direction toward the irradiated object as substantially parallel light.

3. The image reading device according to claim 2, further comprising
a frame that houses or holds the light sources, the concave mirrors, the first lens mirrors, the planar mirrors, the apertures, the second lens mirrors and the light receivers.

4. The image reading device according to claim 2, wherein
the light sources are arranged in an array shape along the main scanning direction of the irradiated object; and
the concave mirrors are arranged so as to extend in the main scanning direction of the irradiated object.

5. The image reading device according to claim 1, further comprising
a light source; and
a light-guiding member that irradiates light from the light source onto an irradiated section of the irradiated object.

6. The image reading device according to claim 5, further comprising
a frame that houses or holds the light source, the light-guiding member, the first lens mirrors, the planar mirrors, the apertures, the second lens mirrors and the light receivers.

7. The image reading device according to claim 5, wherein
the light-guiding member is a rod shaped light-guiding member that allows light that enters from the light source to propagate and irradiates the propagating light along the main scanning direction of the irradiated object.

8. The image reading device according to claim 1, wherein
the first lens mirrors are arranged in an array shape along the main scanning direction so that adjacent mirrors reflect the scattered light reflected by the irradiated object in different directions from each other in order that light reflected by the first lens mirrors does not cross when viewed from the sub-scanning direction.

9. The image reading device according to claim 1, wherein
the first lens mirrors are arranged in an array shape along the main scanning direction so that mirrors that reflect the scattered light reflected by the irradiated object as an angled, substantially parallel bundle of rays to one side in the sub-scanning direction, and mirrors that reflect the scattered light reflected by the irradiated object as an angled, substantially parallel bundle of rays to the other side in the sub-scanning direction are alternately adjacent in order that light reflected by the first lens mirrors does not cross when viewed from the sub-scanning direction.

10. The image reading device according to claim 1, wherein
the first lens mirrors are arranged in a staggered shape with a read line that extends in the main scanning direction of the irradiated object as a center so that mirrors that are arranged on one side in the sub-scanning direction and mirrors that are arranged on the other side in the sub-scanning direction are alternately adjacent.

11. The image reading device according to claim 1, wherein
the first lens mirrors and the second lens mirrors are arranged in a staggered shape with a read line that extends in the main scanning direction of the irradiated object as a center so that pairs of a first lens mirror and a second lens mirror that are arranged on one side in the sub-scanning direction and pairs of a first lens mirror and a second lens mirror that are arranged on the other side in the sub-scanning direction are alternately adjacent.

* * * * *